(12) United States Patent
Shin et al.

(10) Patent No.: US 8,818,126 B2
(45) Date of Patent: Aug. 26, 2014

(54) METHOD AND APPARATUS FOR BLOCK-BASED IMAGE DENOISING

(75) Inventors: Gun-shik Shin, Suwon-si (KR); Dong-hyun Kim, Suwon-si (KR); Jae-hun Lee, Yongin-si (KR); Sang-yun Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 231 days.

(21) Appl. No.: 12/913,909

(22) Filed: Oct. 28, 2010

(65) Prior Publication Data

US 2011/0142368 A1 Jun. 16, 2011

(30) Foreign Application Priority Data

Dec. 16, 2009 (KR) .................. 10-2009-0125701

(51) Int. Cl.
*G06K 9/40* (2006.01)
*G06K 9/36* (2006.01)

(52) U.S. Cl.
USPC .......................... 382/268; 382/232

(58) Field of Classification Search
None
See application file for complete search history.

(56) References Cited

U.S. PATENT DOCUMENTS

| 6,188,799 | B1* | 2/2001 | Tan et al. ....................... 382/260 |
| 7,580,077 | B2* | 8/2009 | Fazzini ......................... 348/448 |
| 7,734,115 | B2  | 6/2010 | Kang et al. |
| 7,903,179 | B2* | 3/2011 | Morino ......................... 348/701 |
| 8,023,562 | B2* | 9/2011 | Zheludkov et al. ...... 375/240.16 |
| 8,086,052 | B2* | 12/2011 | Toth et al. ...................... 382/236 |
| 2006/0159351 | A1* | 7/2006 | Bae et al. ....................... 382/233 |
| 2008/0267530 | A1* | 10/2008 | Lim .............................. 382/284 |
| 2008/0285655 | A1* | 11/2008 | Au et al. .................... 375/240.16 |
| 2008/0285868 | A1* | 11/2008 | Rai et al. ...................... 382/240 |
| 2009/0041376 | A1* | 2/2009 | Carletta et al. ............... 382/274 |
| 2010/0246691 | A1* | 9/2010 | Filippini et al. ......... 375/240.29 |
| 2010/0266041 | A1* | 10/2010 | Gish et al. ............... 375/240.15 |
| 2011/0063517 | A1* | 3/2011 | Luo et al. ...................... 348/663 |

FOREIGN PATENT DOCUMENTS

| KR | 10-0800888 | 1/2008 |
| KR | 10-2009-0015459 | 2/2009 |

OTHER PUBLICATIONS

Mahmoudi and Sapiro, "Fast Image and Video Denoising via Nonlocal Means of Similar Neighborhoods", Dec. 2005, IEEE Signal Processing Letters, col. 12, No. 12, pp. 839-842.*
Buadeas and Morel, "A Non-Local Algorithm for Image Denoising", 2005, pp. 4-6.*
Donoho, "De-Noising by Soft-Thresholding", May 1995, IEEE Transaction on Information Theory, vol. 41, No. 3, pp. 613-627.*
Coupé, Yger, Prima, Hellier, Kervrann, and Barillot, "An Optimized Blockwise Nonlocal Means Denoising Filter for 3-D Magnetic Resonance Images", Apr. 2008, IEEE Transactions on Medical Imaging, vol. 27, No. 4, pp. 425-441.*

(Continued)

*Primary Examiner* — Jason M Repko
*Assistant Examiner* — Ryan P Potts
(74) *Attorney, Agent, or Firm* — Sughrue Mion, PLLC

(57) ABSTRACT

A block-based image denoising method includes determining similarities between a current block and reference blocks within a search range around the current block, from among certain-sized blocks divided from an input image; determining weights of the reference blocks with respect to the current block based on the similarities; and generating resultant blocks by denoising the current block with respect to every block of the input image based on the weights of the reference blocks.

17 Claims, 4 Drawing Sheets

(56) References Cited

OTHER PUBLICATIONS

Abstract of IEEE document titled "A Non-Local Algorithm for Image Denoising", authored by Buades et al, published in 2005, 1 page.*

Cover of IEEE Computer Society Conference on Computer Vision and Pattern Recognition, vol. 2, issued Jun. 20-25, 2005, 1 page.*

Lukin, A. "A Multiresolution Approach for Improving Quality of Image Denoising Algorithms," May 19, 2006, IEEE ICASSP 2006, vol. 2, 5 pages.*

* cited by examiner

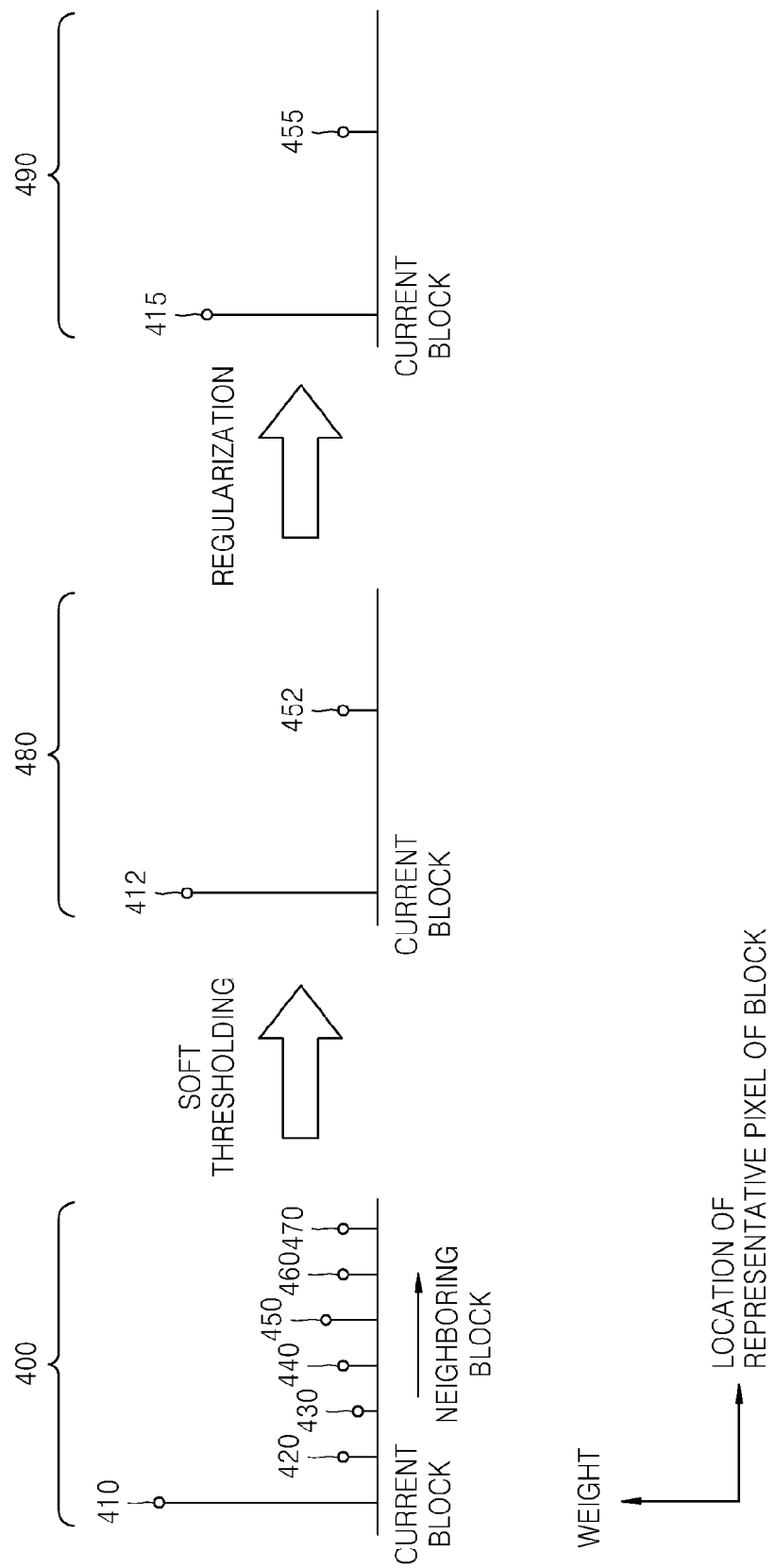

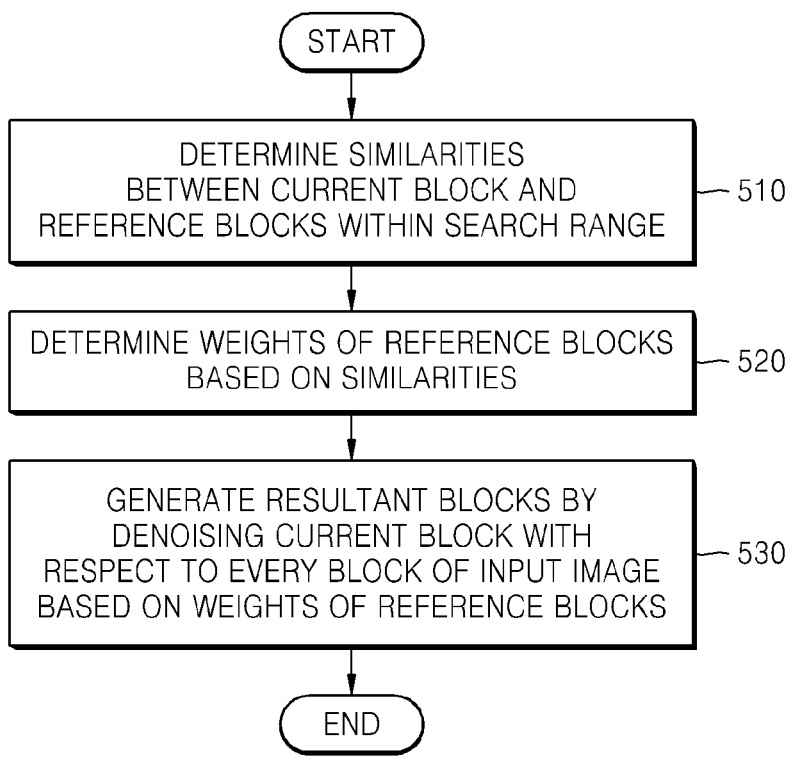

METHOD AND APPARATUS FOR BLOCK-BASED IMAGE DENOISING

CROSS-REFERENCE TO RELATED PATENT APPLICATION

This application claims the benefit of Korean Patent Application No. 10-2009-0125701, filed on Dec. 16, 2009, in the Korean Intellectual Property Office, the disclosure of which is incorporated herein in its entirety by reference.

BACKGROUND

1. Field

The exemplary embodiments relate to an image processing method and apparatus for image and video denoising.

2. Description of the Related Art

For image denoising, a local linear minimum mean square error (LLMMSE)-based filter and a bilateral filter are often used. In an image denoising method using an LLMMSE-based filter or a bilateral filter, pixel-based image processing is performed and then an original pixel value is updated to a filtered pixel value.

As full high definition (FHD) level 1920×1080 resolution video data becomes increasingly popular and the development of ultra definition (UD) level 3840×2160 resolution video data or higher is considered, high speed is required in image denoising for high-quality image processing and real-time image processing.

SUMMARY

The exemplary embodiments provide a method and apparatus for block-based image denoising.

According to an aspect of the exemplary embodiment, there is provided a block-based image denoising method including determining similarities between a current block and reference blocks within a search range around the current block, from among certain-sized blocks divided from an input image; determining weights of the reference blocks with respect to the current block based on the similarities; and generating resultant blocks by denoising the current block with respect to every block of the input image based on the weights of the reference blocks.

The determining of the similarities may include determining a similarity between the current block and each of neighboring blocks disposed within the search range around the current block. The determining of the similarities may include determining a sum of absolute differences (SAD) between the current block and the reference blocks.

The determining of the weights may include determining exponential function values with respect to the SAD between the current block and the reference blocks, as the weights of the reference blocks. The changing of the weights may include changing the weights of the reference blocks by performing soft thresholding, before regularization is performed to calculate a weighted average of the reference blocks with respect to the current block.

The determining of the weights may include changing the weights of the reference blocks in order to reduce differences in boundaries between the resultant blocks obtained by denoising the current block and neighboring blocks.

The generating of the resultant blocks may include generating a resultant block with respect to the current block by using the reference blocks and a weighted average of the weights of the reference blocks.

Denoising is performed on each of color channels of the input image.

According to another aspect of the exemplary embodiment, there is provided a block-based image denoising apparatus including a similarity determination unit for determining similarities between a current block and reference blocks within a search range around the current block, from among certain-sized blocks divided from an input image; a weight determination unit for determining weights of the reference blocks with respect to the current block based on the similarities; and a resultant block generation unit for generating resultant blocks by denoising the current block with respect to every block of the input image based on the weights of the reference blocks.

The weight determination unit may change the weights of the reference blocks in order to reduce differences in boundaries between the resultant blocks obtained by denoising the current block and neighboring blocks.

According to another aspect of the exemplary embodiment, there is provided a computer readable recording medium having recorded thereon a computer program for executing the method.

BRIEF DESCRIPTION OF THE DRAWINGS

The above and other features of the exemplary embodiments will become more apparent by describing in detail exemplary embodiments thereof with reference to the attached drawings in which:

FIG. 4 is a diagram for describing a weight determination method, according to an exemplary embodiment; and FIG. 5 is a flowchart of a block-based image denoising method, according to an exemplary embodiment.

DETAILED DESCRIPTION OF THE EXEMPLARY EMBODIMENTS

Hereinafter, the exemplary embodiments will be described in detail with reference to the attached drawings.

Figure 1:
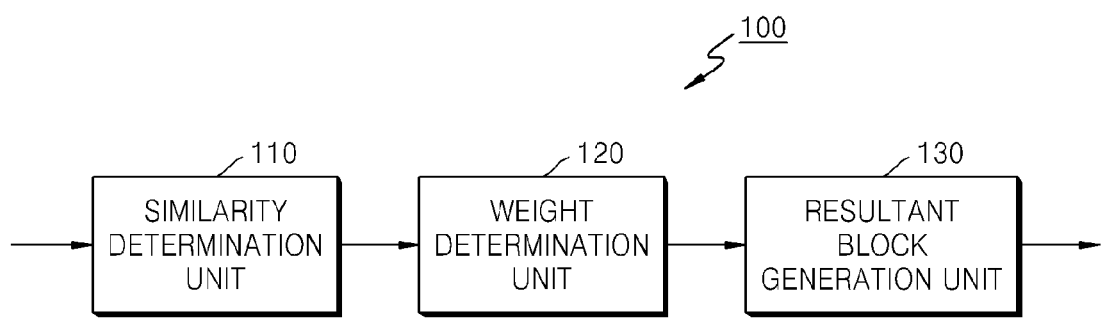
FIG. 1 is a block diagram of a block-based image denoising apparatus, according to an exemplary embodiment.

FIG. 1 is a block diagram of a block-based image denoising apparatus 100, according to an exemplary embodiment.

The block-based image denoising apparatus 100 includes a similarity determination unit 110, a weight determination unit 120 and a resultant block generation unit 130. The block-based image denoising apparatus 100 divides an input image into certain-sized blocks and performs block-based image processing.

The similarity determination unit 110 determines similarities between a current block and reference blocks from among the blocks of the input image.

The current block processed by the similarity determination unit 110 refers to a block that is currently processed from among blocks that are non-overlapping and sequentially processed. A reference block of the current block is one of blocks within a search range around the current block, and the similarity determination unit 110 may determine a similarity between the current block and each of one or more reference blocks within the search range. The reference blocks may be overlappingly selected from within the search range.

The search range around the current block may include a temporally or spatially neighboring region of the current block. Also, a region of an original image or a region of an image formed of previously denoised blocks may be determined as the search range so as to be recursively used for image denoising of a next block. Hereinafter, for convenience of explanation, it is assumed that the similarity determination unit 110 determines the similarities between the current block and the reference blocks based on a spatially neighboring region as the search range in the input original image.

However, the search range around the current block is not limited to the spatially neighboring region of the current block and may also include a temporally or spatially adjacent region of the current block.

The similarity determination unit 110 may use a sum of absolute differences (SAD) between the current block and the reference blocks in order to determine the similarities between the current block and the reference block.

The similarities determined by the similarity determination unit 110 are output to the weight determination unit 120.

The weight determination unit 120 determines weights of the reference blocks with respect to the current block based on the similarities input from the similarity determination unit 110.

The weight determination unit 120 may determine exponential function values of the SAD between the current block and the reference block as the weight of the reference blocks.

The weight determination unit 120 may additionally change the weights of the reference blocks in order to reduce differences in boundaries between resultant blocks obtained by denoising the current block, and neighboring blocks. For example, before regularization is performed to calculate a weighted average of the reference blocks with respect to the current block, the weight determination unit 120 may change the weights of the reference blocks by performing soft thresholding. In this case, a threshold value used to perform soft thresholding may be determined in consideration of average luminance of each of the current block and the neighboring blocks.

The weights determined by the weight determination unit 120 are output to the resultant block generation unit 130.

The resultant block generation unit 130 generates resultant blocks by denoising the current block. The resultant blocks are generated with respect to every block of the input image based on the weights input from the weight determination unit 120. In this case, the resultant blocks processed by the resultant block generation unit 130 correspond on a one-to-one basis with the blocks of the input image and thus are not overlapping in the same manner that the blocks of the input image are not overlapping.

The resultant block generation unit 130 may generate and output a resultant block by denoising the current block by using the reference blocks of the current block and a weighted average of the reference blocks.

The block-based image denoising apparatus 100 may perform denoising on each of color channels of the input image. For example, in order to denoise an YCbCr image, the block-based image denoising apparatus 100 may perform block-based image denoising on each of Y, Cb and Cr channels. Also, in order to denoise an RGB image, the block-based image denoising apparatus 100 may perform block-based image denoising on each of R, G and B channels.

In a resultant image formed of the resultant blocks generated by the resultant block generation unit 130, as block-based image processing is performed, the amount of calculation may be reduced and noise may be effectively removed.

Also, as soft thresholding is performed on weights, a blocking effect that occurs in boundaries between the resultant blocks may be effectively reduced.

Figure 2:
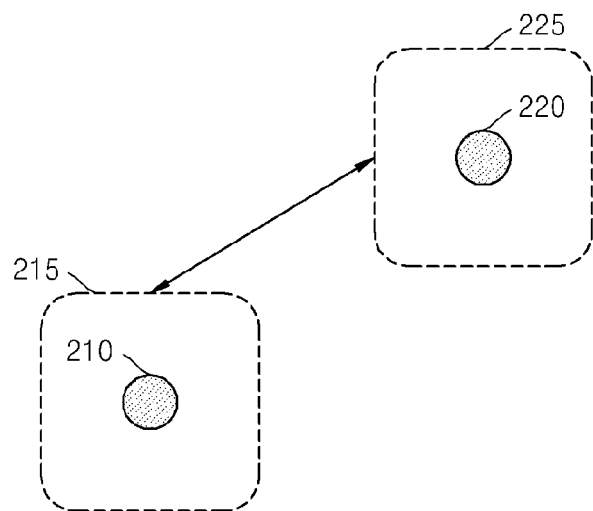
FIG. 2 is a diagram for comparing a pixel-based similarity determination method and a block-based similarity determination method.

FIG. 2 is a diagram for comparing a pixel-based similarity determination method and a block-based similarity determination method.

In the block-based image denoising apparatus 100 illustrated in FIG. 1, the similarity determination unit 110 determines a similarity between a current block and a reference block and the weight determination unit 120 determines a weight of the reference block with respect to the current block. For example, when spatially neighboring image data is used as reference image data, if image processing is performed in units of pixels, a similarity between a current pixel 210 and a neighboring pixel 220 may be measured and then a weight of the neighboring pixel 220 with respect to the current pixel 210 may be determined accordingly.

On the other hand, in the block-based image denoising apparatus 100, the similarity determination unit 110 determines a similarity between a current block 215 and a neighboring block 225 and the weight determination unit 120 determines a weight of the neighboring block 225 with respect to the current block 215 based on the similarity.

Figure 3:
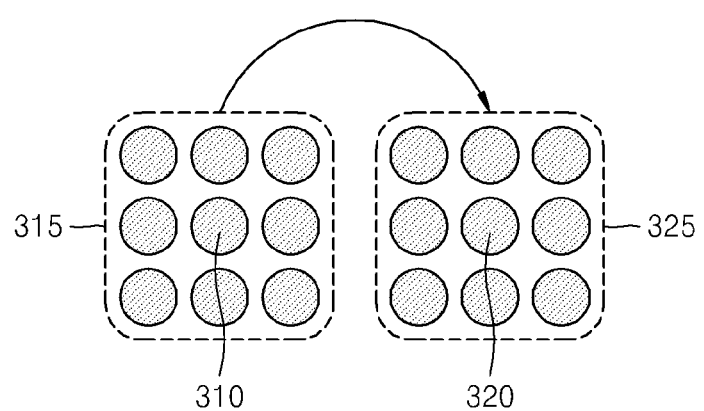
FIG. 3 is a diagram for comparing a pixel-based updating method and a block-based updating method.

FIG. 3 is a diagram for comparing a pixel-based updating method and a block-based updating method.

In the block-based image denoising apparatus 100 illustrated in FIG. 1, the resultant block generation unit 130 outputs resultant blocks obtained by denoising a current block with respect to every block of an input image, in units of blocks. If image processing is performed in units of pixels, a current pixel 310 may be updated to a resultant pixel 320 by denoising the current pixel 310. On the other hand, in the block-based image denoising apparatus 100, the resultant block generation unit 130 updates a current block 315 to a resultant block 325 by denoising the current block 315.

As described above in relation to FIGS. 2 and 3, since similarity determination, weight determination, and denoised resultant block generation are performed in units of blocks, in comparison to a pixel-based image denoising apparatus, the block-based image denoising apparatus 100 may accurately detect edge regions and texture regions, and thus may reduce damage to an image signal.

Accordingly, in comparison to a pixel-based image denoising apparatus, the block-based image denoising apparatus 100 may realize a visually-natural connection between pixels even when image processing is performed on a region including a plurality of pixels, e.g., an edge region or a texture region.

Also, the block-based image denoising apparatus 100 may effectively remove noise that occurs over a plurality of pixels, e.g., film grain noise or scaled noise, by using a block that is larger than the noise. Also, in comparison to a pixel-based image denoising apparatus, the block-based image denoising apparatus 100 may reduce the amount of calculation due to block-based image processing.

Meanwhile, in the block-based image denoising apparatus 100, when the weighted average of the reference blocks with respect to the current block is calculated, the resultant block generation unit 130 performs regularization such that a sum of the weights of the reference blocks has a value 1. However, due to differences in image characteristics such as luminance between the current block and the reference blocks, a blocking effect may occur in boundaries between the resultant blocks. This is because, for example, after the weights of the reference blocks are regularized to calculate the weighted average, when blocks having low luminance levels from among original blocks are denoised, variations in luminance before and after denoising is performed are relatively large and thus denoising levels of blocks are different.

Accordingly, in order to prevent the blocking effect in the boundaries between the resultant blocks, before regularization is performed to calculate the weighted average, the weight determination unit 120 may adjust the weights of the reference blocks.

FIG. 4 is a diagram for describing a weight determination method of the weight determination unit 120 illustrated in FIG. 1, according to an explanary embodiment.

In first through third graphs 400, 480 and 490, a horizontal axis represents the location of a representative pixel of a block and a vertical axis represents a weight. The first through third graphs 400, 480 and 490 show weight with respect to the locations of representative pixels of blocks according to operational steps. In FIG. 4, for convenience of explanation, it is assumed that a spatially neighboring region around a current block is selected as a search range and that one of neighboring blocks of the current block within the search range is selected as a reference block.

The first graph 400 shows initial weights 410, 420, 430, 440, 450, 460 and 470 determined by the weight determination unit 120. With respect to blocks that are spatially included within the search range around the current block, the initial weight 410 of the current block and the initial weights 420, 430, 440, 450, 460 and 470 of neighboring blocks may be determined.

The weight determination unit 120 may determine the initial weights 410, 420, 430, 440, 450, 460 and 470 as represented by Equation 1.

$$w_1(i, m) = \exp\left(-\frac{\|\vec{y}_{(i)} - \vec{y}_{(m)}\|_{l_1}}{2\sigma_n^2}\right)$$ [Equation 1]

When M is an integer greater than a value 0, within a search range formed of M blocks, $y_{(i)}$ represents an ith block, i.e., a current block, and $y_{(m)}$ represents an mth block, i.e., a neighboring block. Also, i and m are integers greater than a value 0 and equal to or less than M.

$\vec{y}_{(i)}$ represents a vector of the current block $y_{(i)}$ and $\vec{y}_{(m)}$ represents a vector of the neighboring block $y_{(m)}$.

$\|-\|_1$ is a function for outputting an SAD of an input and represents a similarity between the current block and the neighboring block.

$\sigma_n^2$ represents a variance value. The weight determination unit 120 may use a fixed variance value or a variance value measured with respect to the current block and the neighboring block.

The weight determination unit 120 may determine a weight of the neighboring block with respect to the current block in the form of a Gaussian curve function by using the similarity between the current block and the neighboring block and an exponential function using a variance value as an input. Consequently, the weight determination unit 120 may determine $W_1(i,m)$ as an initial weight of the neighboring block, i.e., the mth block with respect to the current block, i.e., the ith block.

The second graph 480 shows intermediate weights 412 and 452 adjusted due to soft thresholding performed by the weight determination unit 120. The weight determination unit 120 may obtain the intermediate weights 412 and 452 by performing soft thresholding on the initial weights 410, 420, 430, 440, 450, 460 and 470. In more detail, soft thresholding may be performed as represented by Equation 2.

$$w_2(i, m) = \text{Soft}(w_1(i, m), th)$$ [Equation 2]

$$= \begin{cases} w_1(i, m) - th, & \text{if } w_1(i, m) > th \\ 0, & \text{otherwise} \end{cases}$$

Soft( ) is a soft thresholding function and is defined as represented by Equation 2. In more detail, as soft thresholding is performed on the initial weight $W_1(i,m)$ by using the function Soft( ) using a threshold value th as an input, $W_2(i,m)$ is determined as a value 0 with respect to the initial weights 420, 430, 440, 460 and 470 that are less than the threshold value th, and is determined as the intermediate weights 412 and 452 with respect to the initial weights 410 and 450 that are greater than the threshold value th by subtracting the threshold value th from the initial weights 410 and 450.

The third graph 490 shows ultimate weights 415 and 455 obtained by performing regularization. In more detail, as regularization is performed on intermediate weights generated by performing soft thresholding, ultimate weights of neighboring blocks of a current block within a search range may be determined. According to the third graph 490, only the intermediate weights 412 and 452 that do not have a value 0 may be regularized into the ultimate weights 415 and 455 having valid values.

In the block-based image denoising apparatus 100, the resultant block generation unit 130 may generate a resultant block by denoising the current block based on the weights determined by the weight determination unit 120 and the weighted average calculated from the weights.

The resultant block generation operation of the resultant block generation unit 130 may be performed as represented by Equation 3.

$$x(i) = \frac{1}{Z} \sum_{m \in N_i} w_2(i, m) y(m)$$ [Equation 3]

$N_i$ represents a search range around a current block and Z is a regularization factor for maintaining a sum of weights as a value 1. Accordingly, a resultant block x(i) obtained by denoising the current block y(i) may be determined based on a weighted average of neighboring blocks y(m) within the search range $N_i$ by using weights $W_2(i,m)$ for preventing a blocking effect that occurs in boundaries between resultant blocks x(i).

The weight determination unit 120 may optionally adjust the weights to prevent a blocking effect that occurs in boundaries between the resultant blocks. Accordingly, the resultant block generation unit 130 may determine the resultant blocks as represented by Equation 4 by using the weights determined by the weight determination unit 120 without adjusting the weights for preventing the blocking effect.

$$x'(i) = \frac{1}{Z} \sum_{m \in N_i} w_1(i, m) y(m)$$ [Equation 4]

Accordingly, a resultant block x'(i) obtained by denoising a current block without considering a blocking effect that occurs in boundaries between resultant blocks x'(i) may be generated by using initial weights $w_1(i,m)$ determined based on similarities between the current block and neighboring blocks y(m) and a weighted average of the neighboring blocks y(m).

If noise exists in image data, in an image signal having noise, an average value of the image signal is maintained constant and an average value of the noise is always 0. As such, in order to effectively perform image denoising, statistically, a block size may be equal to or greater than a certain size.

Accordingly, the block-based image denoising apparatus 100 is based on certain-sized blocks and determines similarities between a current block and reference blocks by using weights instead of on/off states and image processing using weights may allow non-artificial, i.e., natural, image denoising.

The block-based image denoising apparatus 100 is more effective for grain denoising in comparison to a pixel-based image denoising apparatus. Also, the block-based image denoising apparatus 100 regards a region, in which a significant stair step effect occurs, as an edge so as not to perform denoising on the edge, and performs denoising on a region around the edge, in which a slight stair step effect occurs, and thus a visually-naturally connected edge may be generated.

FIG. 5 is a flowchart of a block-based image denoising method, according to an exemplary embodiment.

In operation 510, from among certain-sized blocks divided from an input image, similarities between a current block and reference blocks within a search range around the current block are determined. The similarities between the current block and the reference blocks may be calculated by using absolute differences between an average value of the current block and the average values of the reference blocks.

In operation 520, weights of the reference blocks with respect to the current block are determined based on the similarities. The weights of the reference blocks may be proportional to exponential function values regarding the similarities between the current block and the reference blocks.

Also, in order to reduce differences in boundaries between resultant blocks obtained by denoising the current block and neighboring blocks, the weights of the reference blocks may be changed. According to an exemplary embodiment, the weights of the reference blocks may be adjusted by performing soft thresholding.

In operation 530, resultant blocks are generated for every block of the input image, by denoising the current block based on the weights of the reference blocks. The resultant blocks may be generated by denoising the current block based on the weights of the reference blocks within the search range and a weighted average of the reference blocks.

In the block-based image denoising method, since denoised resultant blocks are generated by performing image processing on blocks that are not overlappedly processed, block-based denoising may be performed based on block-based similarities. Thus, according to an exemplary embodiment, in comparison to a pixel-based image denoising method, an image that is denoised to be naturally connected to neighboring images may be generated. Also, due to block-based calculation, the speed of calculation may be increased in comparison to the pixel-based image denoising method.

Furthermore, as image denoising is performed in consideration of image characteristics between a current block and neighboring blocks, a blocking effect that may occur due to block-based image processing may be prevented.

Meanwhile, the exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While the exemplary embodiments have been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A block-based image denoising method comprising:
   determining similarities between a current block and reference blocks within a search range around the current block, the current block being from among blocks of an input image;
   determining weights of the reference blocks surrounding the current block based on the similarities;
   changing the weights of the reference blocks to reduce differences in boundaries between the resultant block obtained by denoising the current block, and neighboring blocks, by performing soft thresholding on the weights using a threshold determined from an average luminance of each of the current block and the neighboring blocks, before regularization; and
   generating a resultant block by denoising the current block based on the weights of the reference blocks,
   wherein the current block is one of a plurality of blocks which are divided from the input image and non-overlapping to be sequentially processed,
   wherein each block of the plurality of blocks includes a plurality of pixels in the input image, and
   wherein the search range around the current block comprises one of a temporally or spatially adjacent region of the current block.

2. The method of claim 1, wherein the determining of the similarities comprises determining a similarity between the current block and each of neighboring blocks disposed within the search range around the current block.

3. The method of claim 1, wherein the determining of the similarities comprises determining a sum of absolute differences (SAD) between the current block and the reference blocks.

4. The method of claim 3, wherein the determining of the weights comprises determining exponential function values with respect to the SAD between the current block and the reference blocks, as the weights of the reference blocks.

5. The method of claim 1 wherein the changing the weights of the reference blocks comprises performing regularization with respect to the weights of the reference blocks to calculate a weighted average of the reference blocks with respect to the current block.

6. The method of claim 5, wherein the soft thresholding comprises: comparing one of the weights of the reference blocks to the threshold; and reducing the one of the weights of the reference blocks by the threshold if the one of the weights of the reference blocks is greater than the threshold or reducing the one of the weights of the reference blocks to zero if the one of the weights of the reference blocks is not greater than the threshold.

7. The method of claim 1, wherein the generating of the resultant block comprises generating the resultant block with respect to the current block by using the reference blocks and a weighted average of the weights of the reference blocks.

8. The method of claim 1, wherein denoising is performed on each of color channels of the input image.

9. A non-transitory computer readable recording medium having recorded thereon a computer program for executing the method of claim 1.

10. A block-based image denoising apparatus comprising:
- a similarity determiner which determines similarities between a current block and reference blocks within a search range around the current block, the current block being from among blocks of an input image;
- a weight determiner which determines weights of the reference blocks surrounding the current block based on the similarities and changes the weights of the reference blocks to reduce differences in boundaries between the resultant block obtained by denoising the current block, and neighboring blocks, by performing soft thresholding on the weights using a threshold determined from an average luminance of each of the current block and the neighboring blocks, before regularization;
- a resultant block generator which generates a resultant block by denoising the current block based on the weights of the reference blocks; and
- an image processor, in cooperation with the similarity determiner, the weight determiner and the resultant block generator,
- wherein the current block is one of a plurality of blocks which are divided from the input image and non-overlapping to be sequentially processed,
- wherein each block of the plurality of blocks includes a plurality of pixels in the input image, and
- wherein the search range around the current block comprises one of a temporally or spatially adjacent region of the current block.

11. The apparatus of claim 10, wherein the similarity determiner determines a similarity between the current block and each of neighboring blocks disposed within the search range around the current block.

12. The apparatus of claim 10, wherein the similarity determiner determines a sum of absolute differences (SAD) between the current block and the reference blocks.

13. The apparatus of claim 12, wherein the weight determiner determines exponential function values with respect to the SAD between the current block and the reference blocks, as the weights of the reference blocks.

14. The apparatus of claim 10, wherein the weight determination performs regularization with respect to the weights of the reference blocks to calculate a weighted average of the reference blocks with respect to the current block.

15. The apparatus of claim 14, wherein in the soft thresholding, one of the weights of the reference blocks is compared to the threshold, and if the one of the weights of the reference blocks is greater than the threshold, reducing the one of the weights of the reference blocks by the threshold, and if the one of the weights of the reference blocks is not greater than the threshold, reducing the one of the weights of the reference blocks to zero.

16. The apparatus of claim 10, wherein the resultant block generator generates the resultant block with respect to the current block by using the reference blocks and a weighted average of the weights of the reference blocks.

17. The apparatus of claim 10, wherein denoising is performed on each of color channels of the input image.

* * * * *